US010642751B2

(12) United States Patent
Warkentin et al.

(10) Patent No.: US 10,642,751 B2
(45) Date of Patent: May 5, 2020

(54) HARDWARE-ASSISTED GUEST ADDRESS SPACE SCANNING IN A VIRTUALIZED COMPUTING SYSTEM

(71) Applicant: VMware, Inc., Palo Alto, CA (US)

(72) Inventors: Andrei Warkentin, North Andover, MA (US); Alexander Fainkichen, Southborough, MA (US); Cyprien Laplace, Boston, MA (US); Ye Li, Newton Highlands, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/655,182

(22) Filed: Jul. 20, 2017

(65) Prior Publication Data

US 2019/0026232 A1 Jan. 24, 2019

(51) Int. Cl.
*G06F 12/1036* (2016.01)
*H04L 12/801* (2013.01)
*H04L 12/755* (2013.01)
*H04L 12/24* (2006.01)
*H04L 12/46* (2006.01)
*G06F 9/455* (2018.01)
*G06F 11/00* (2006.01)

(52) U.S. Cl.
CPC ...... *G06F 12/1036* (2013.01); *G06F 9/45558* (2013.01); *G06F 11/00* (2013.01); *H04L 12/4641* (2013.01); *H04L 41/0654* (2013.01); *H04L 45/021* (2013.01); *H04L 47/193* (2013.01); *G06F 2009/45583* (2013.01); *G06F 2009/45595* (2013.01)

(58) Field of Classification Search
CPC ....... G06F 12/1036; G06F 2009/45595; H04L 45/021; H04L 47/193; H04L 41/0654; H04L 12/4641
See application file for complete search history.

(56) References Cited

U.S. PATENT DOCUMENTS

| | | | | |
|---|---|---|---|---|
| 5,586,283 A | * | 12/1996 | Lopez-Aguado | ............................ G06F 12/1027 711/206 |
| 6,473,848 B2 | * | 10/2002 | Bouraoui | ............ G06F 11/3471 711/203 |
| 7,640,543 B2 | * | 12/2009 | Vij | ...................... G06F 12/1491 711/152 |
| 8,451,281 B2 | * | 5/2013 | Ginzburg | ............ G06F 12/1036 345/541 |

(Continued)

*Primary Examiner* — Tasnima Matin
(74) *Attorney, Agent, or Firm* — Patterson + Sheridan, LLP

(57) ABSTRACT

An example method of scanning a guest virtual address (GVA) space generated by a guest operating system executing in a virtual machine of a virtualized computing system includes setting, in a scan of the GVA space by a hypervisor that manages the virtual machine, a current GVA to a first GVA in the GVA space; executing, on a processor allocated to the virtual machine, an address translation instruction, which is in an instruction set of the processor, to perform a first address translation of the current GVA; reading a register of the processor to determine a first error resulting from the first address translation; determining, in response to the first error, a level of a faulting page table in a first page table hierarchy generated by the guest operating system; and setting the current GVA to a second GVA based on the level of the faulting page table.

20 Claims, 4 Drawing Sheets

(56) References Cited

U.S. PATENT DOCUMENTS

| | | | |
|---|---|---|---|
| 2006/0069899 A1* | 3/2006 | Schoinas | G06F 12/1081 711/206 |
| 2007/0214340 A1* | 9/2007 | Leveille | G06F 9/52 711/203 |
| 2009/0172330 A1* | 7/2009 | Dewan | G06F 12/145 711/163 |
| 2009/0292899 A1* | 11/2009 | Mansell | G06F 12/1009 711/207 |
| 2009/0300263 A1* | 12/2009 | Devine | G06F 12/1009 711/6 |

* cited by examiner

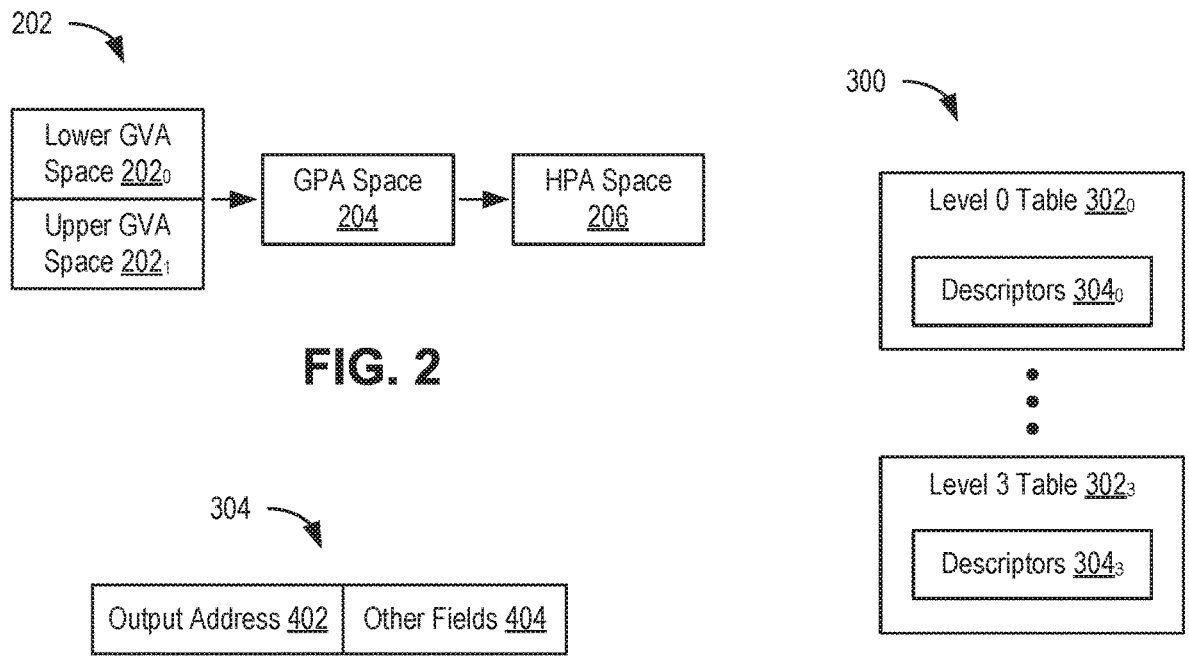
FIG. 2
FIG. 3
FIG. 4
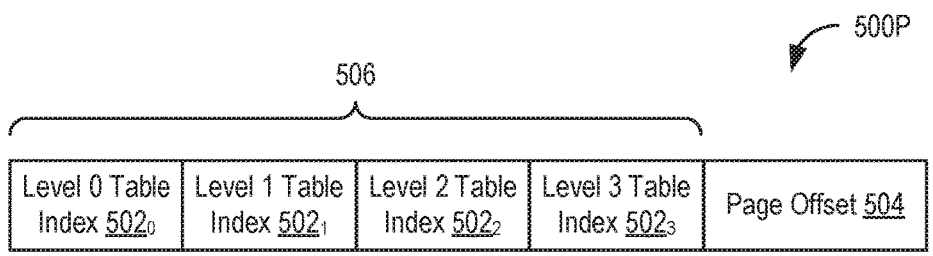
FIG. 5A
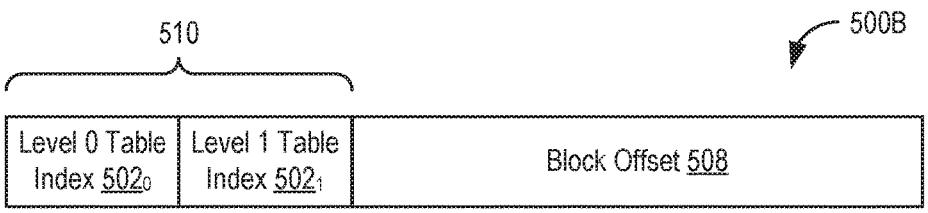
FIG. 5B

HARDWARE-ASSISTED GUEST ADDRESS SPACE SCANNING IN A VIRTUALIZED COMPUTING SYSTEM

BACKGROUND

Computer virtualization is a technique that involves encapsulating a physical computing machine platform into virtual machine(s) executing under control of virtualization software on a hardware computing platform or "host" (collectively referred to as a "virtualized computing system"). A virtual machine (VM) provides virtual hardware abstractions for processor, memory, storage, and the like to a guest operating system (OS) and guest application(s) that run on the guest OS. The virtualization software, also referred to as a "hypervisor," includes one or more virtual machine monitors (VMMs) to provide execution environment(s) for the virtual machine(s). The hypervisor itself can be an OS having a kernel and user applications that run on the kernel. Thus, a virtualized computing system can include various software components executing on the hardware, including the hypervisor kernel, hypervisor user application(s), guest OS(s), and guest application(s).

Modern hypervisors manage memory using a two-stage translation scheme. A guest OS allocates guest virtual memory to its applications, which is mapped to guest physical memory. The hypervisor allocates guest physical memory among its virtual machines, which is mapped to host physical memory. A guest virtual address is translated to a host physical address using two stages of translation: (1) guest virtual address to guest physical address; and (2) guest physical address to host physical address. Modern central processing units (CPUs) include memory management units (MMUs) and translation lookaside buffers (TLBs) that support two-stage address translation at the hardware level. Each guest OS maintains guest page tables for use with the first address translation stage ("first stage page tables"), and the hypervisor maintains hypervisor page tables for use with the second address translation stage ("second stage page tables").

Modern hypervisors attempt to optimize second stage page tables in order to reduce TLB pressure, use less memory, reduce faults where possible, and the like. One technique to optimize second stage page tables is to walk the first stage page tables, looking for large mappings of guest virtual addresses to guest physical addresses. Scanning first stage tables, however, is a slow process that involves complex algorithms to reduce VM pauses. Accordingly, it is desirable to provide an efficient technique for scanning guest virtual address spaces in a virtualized computing system.

SUMMARY

One or more embodiments provide a method of scanning a guest virtual address (GVA) space generated by a guest operating system executing in a virtual machine of a virtualized computing system. The method includes setting, in a scan of the GVA space by a hypervisor that manages the virtual machine, a current GVA to a first GVA in the GVA space; executing, on a processor allocated to the virtual machine, an address translation instruction, which is in an instruction set of the processor, to perform a first address translation of the current GVA; reading a register of the processor to determine a first error resulting from the first address translation; determining, in response to the first error, a level of a faulting page table in a first page table hierarchy generated by the guest operating system; and setting the current GVA to a second GVA based on the level of the faulting page table.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a block diagram illustrating the relationship between virtual and physical address spaces in a two-stage translation scheme.

FIG. 3 is a block diagram illustrating an example page table hierarchy.

FIG. 4 is a block diagram illustrating an example page table entry.

FIG. 5A is a block diagram illustrating the structure of an input address that maps to a page.

FIG. 5B is a block diagram illustrating the structure of an input address that maps to a block of pages.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
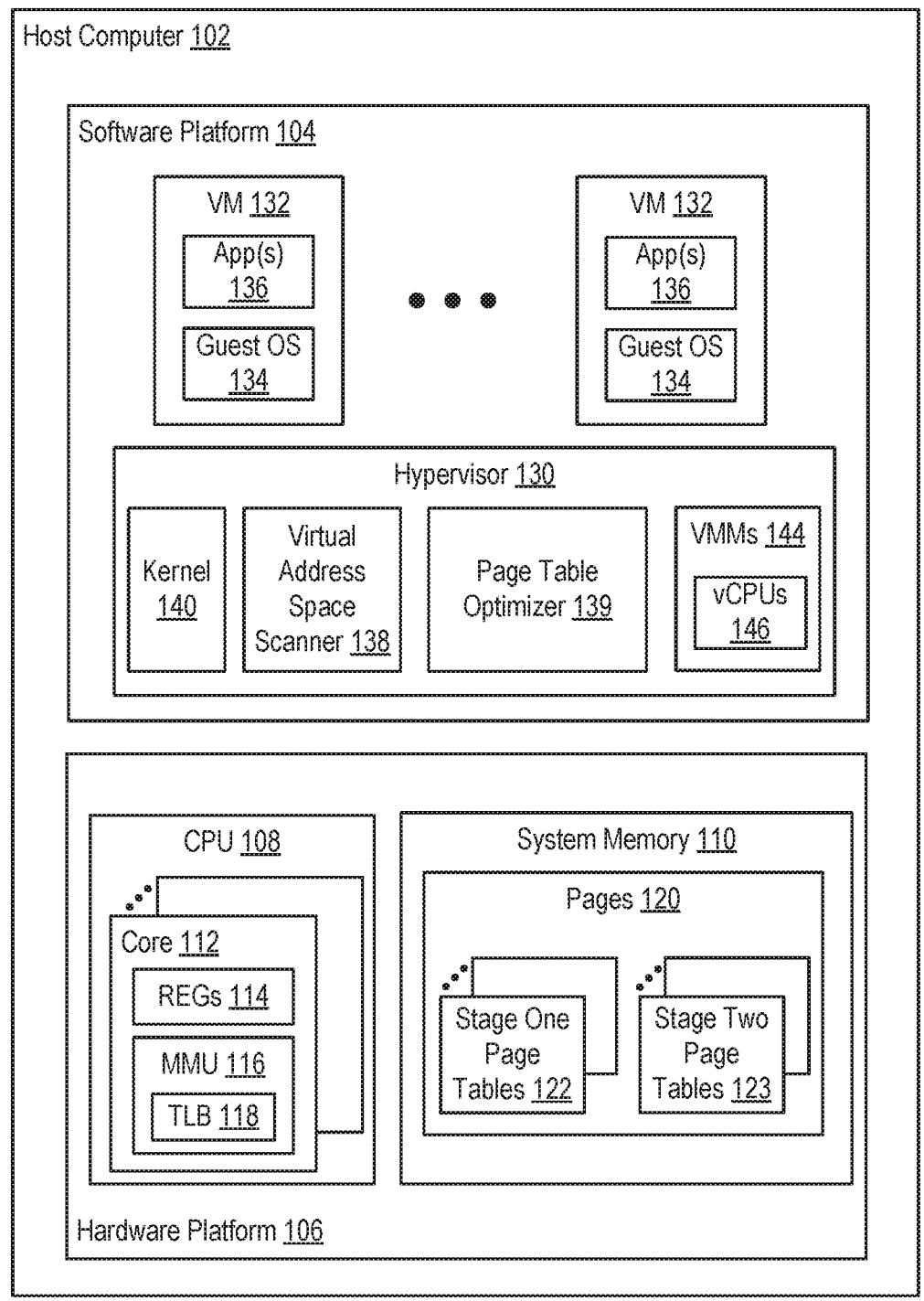
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108 and system memory 110, as well as a storage system (storage), input/output devices, and the like (not shown). CPU 108 is configured to execute instructions, for example, executable instructions that perform one or more operations described herein and may be stored in system memory 110 and the storage system. System memory 110 is a device allowing information, such as executable instructions, virtual disks, configurations, and other data, to be stored and retrieved. System memory 110 may include, for example, one or more random access memory (RAM) modules.

CPU 108 includes one or more cores 112. Each core 112 is a microprocessor or like type processor element. Each core 112 includes various registers 114 and a memory management unit (MMU) 116, as well as various other circuits that are omitted for clarity (e.g., an arithmetic logic unit (ALU), floating point unit (FPU), etc.). CPU 108 can include other circuitry shared by cores 112 (e.g., cache memory), which is omitted for clarity. Registers 114 include program execution registers for use by code executing on a core 112 and system/control registers for use by code to configure a core 112. Code is executed on a core 112 at a particular privilege level (PL) of a hierarchy of privilege levels. In an embodiment, each core 112 is a processing element compliant with the ARM® v8 architecture or the like that includes four exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, each core 112 supports a hierarchy of at least three hierarchical privilege levels, including the user PL, the supervisor PL, and the hypervisor PL in order of increasing execution privilege. Various examples described herein refer to a processor (e.g., a core 112) having the ARM® v8 hardware architecture and executing in the 64-bit execution state (referred to as AArch64). It is to be understood that the memory scanning techniques described herein can be employed with processors having similar hardware architectures consistent with the functional description herein.

Software platform 104 includes a virtualization layer that abstracts processor, memory, storage, and networking resources of hardware platform 106 into one or more virtual machines ("VMs") 132 that run concurrently on host computer 102. VMs 132 run on top of the virtualization layer, referred to herein as a hypervisor 130, which enables sharing of the hardware resources by VMs 132. One example of hypervisor 130 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 132 supported by hypervisor 130 includes guest software (also referred to as guest code) that runs on the virtualized resources supported by hardware platform 106. In the example shown, the guest software of each VM 132 includes a guest OS 134 and one or more applications (apps) 136. Guest OS 134 can be any commodity operating system known in the art, such as such as Linux®, Microsoft Windows®, Mac OS®, or the like.

Hypervisor 130 includes, among other components, a kernel 140, a virtual address space scanner 138, page table optimizer 139, and virtual machine monitors (VMMs) 144. Kernel 140 provides operating system functionality (e.g., process creation and control, file system, process threads, etc.), as well as CPU scheduling and memory scheduling. VMMs 144 implement the virtual system support needed to coordinate operations between hypervisor 130 and VMs 132. Each VMM 144 manages a corresponding virtual hardware platform that includes emulated hardware, such as virtual CPUs (vCPUs 146) and guest physical memory. vCPUs 146 are backed by cores 112. Guest physical memory is backed by system memory 110. Each virtual hardware platform supports the installation of guest software in a corresponding VM 132. Each VMM 144 also executes instances of virtual address space scanner 138 and page table optimizer 139, as discussed further below. In embodiments, kernel 140 executes at EL2 or EL1; VMMs execute at EL2; guest OS in each VM 132 executes at EL1; and applications 136 execute at EL1 or EL0.

MMU 116 implements memory management in the form of paging of system memory 110. MMU 116 controls address translation and access permissions for memory accesses made by core 112. MMU 116 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 116 generates an exception. MMU 116 is controlled by a plurality system registers in registers 114. MMU 116 can include a translation lookaside buffer (TLB) 118 that caches address translations.

One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes system memory 110. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software. In virtualized computing system 100, guest software in a VM 132 accesses memory using the two-stage address translation scheme. In this context, a virtual address is referred to as a "guest virtual address" or GVA. An intermediate physical address is referred to as a "guest physical address" or GPA. A physical address is referred to as a "host physical address" or HPA.

FIG. 2 is a block diagram illustrating the relationship between virtual and physical address spaces in a two-stage translation scheme. In an embodiment, a GVA space 202 is divided into a lower GVA space $202_0$ and an upper GVA space $202_1$. For example, the ARM® v8 architecture specifies a field TCR_EL1.T0SZ that dictates the VA width for the EL1/EL0 address translation scheme. As used herein, the notation XXX.YYY indicates a field YYY in a register XXX. In an embodiment, the VA space for the two-stage address translation scheme can be split into two 48-bit subranges within a full 64-bit address range: the bottom 48-bit VA subrange (lower GVA space $202_0$) is between 0x0000_0000_0000_0000 and 0x0000_FFFF_FFFF_FFFF and the top 48-bit VA subrange (upper GVA space $202_1$) is between 0xFFFF_0000_0000_0000 and 0xFFFF_FFFF_FFFF_FFFF. In other embodiments, the GVA space 202 can be divided into upper and lower spaces having different sizes or may be undivided. A guest OS 134 maps addresses in GVA space 202 to addresses in GPA space 204. Hypervisor 130 maps addresses in GPA space 204 to addresses in HPA space 206.

Returning to FIG. 1, MMU 116 implements different translation schemes depending on privilege level. For example, CPUs compliant with the ARM® v8 architecture include a single stage translation scheme for code executing at EL2 and a two-stage translation scheme for code executing at EL1 and EL0. In particular, the first stage of the two-stage translation scheme maps GVAs to GPAs and is controlled from EL1. The second stage of the two-stage translation scheme maps GPAs to HPAs and is controlled from EL2. The translation stages can be enabled/disabled by setting fields in particular registers 114.

MMU 116 divides system memory 110 into pages 120. A "page" is the smallest unit of memory for which an IA-to-OA mapping can be specified. Each page (also referred to herein as a "memory page") includes a plurality of separately addressable data words, each of which in turn includes one or more bytes. Each address includes an upper portion that specifies a page and a lower portion that specifies an offset into the page. Each address translation involves translating the upper portion of the IA into an OA. CPU 108 can support one or more page sizes. For example, processors compliant with the ARM® v8 architecture can support 4 kilobyte (KB), 16 KB, and 64 KB page sizes (also referred to as granule size). Processors compliant with the ARM® v8 architecture can also translate "large pages," such as 2 megabyte (MB) and 1 gigabyte (GB) blocks for the 4 KB granule size, 32 MB, 64 gigabyte (GB), and 128 terabyte (TB) blocks for the 16 KB granule size, and 512 MB and 4 TB blocks for the 64 KB granule size. These large pages will be referred to herein as "blocks" or "memory blocks" to distinguish them from pages, which are the smallest addressable unit of memory. Each memory block includes a plurality of pages (e.g., a 2 MB block includes five hundred 4 KB pages). Other processors may support other page and block sizes. In addition, the width of the IA is configurable for each address translation scheme.

Each enabled stage of address translation in a translation scheme uses memory mapped tables referred to as page tables. If not cached in TLB 118, a given address translation requires one or more lookups of the page tables (referred to as one or more levels of lookup). A page table walk, which is implemented by the hardware of MMU 116, is the set of lookups required to translate a VA to a PA. The page tables are organized into hierarchies, where each page table hierarchy includes a base table and a plurality of additional tables corresponding to one or more additional levels. For example, the ARM® v8 architecture specifies up to four levels of page tables referred to as level 0 through level 3 tables. The number of levels in a page table hierarchy depends on the page size.

FIG. 3 is a block diagram illustrating a page table hierarchy 300. In this example, page table hierarchy 300 includes four levels designated level 0, level 1, level 2, and level 3. That is, page table hierarchy 300 includes level 0 table $302_0$ through level 3 table $302_3$ each including descriptors $304_0$ through descriptors $304_3$, respectively. Level 0 table $302_0$ is the base page table for page table hierarchy 300. Other example page table hierarchies can have more or less than four levels, depending on the supported page sizes. In general, a page table hierarchy includes a lowest level and one or more upper levels. In page table hierarchy 300, the lowest level is level 3 table $302_3$ and the upper levels are the level 0, level 1, and level 2 tables $302_0$ . . . $302_2$. The descriptors in the lowest level reference a memory page (e.g., descriptors $304_3$ reference memory pages). The descriptors in upper level page tables can reference a memory block or a lower level table.

FIG. 4 is a block diagram illustrating a descriptor 304. Each descriptor 304 includes an output address 402 and other fields 404. Note that descriptor 304 is shown logically and does not denote the specific disposition of output address 402 and other fields 404. Descriptor 304 can be a page descriptor, block descriptor, or table descriptor, depending on the table level. As noted above, descriptors in the lowest level table are page descriptors. Descriptors in upper level tables can be block descriptors or table descriptors. For a page descriptor, output address 402 is the address of a memory page (also referred to as a page number) in the output address space. For a block descriptor, output address 402 is the address of a block in the output address space (a block of pages). For a table descriptor, output address 402 is the address of a lower-level table in the output address space. Other fields 404 can include various permissions and/or control fields associated with output address 404 (e.g., read, write, and execute permissions, memory attributes that control the memory type, access to caches, whether the memory is coherent, etc.).

FIG. 5A is a block diagram illustrating the structure of an input address 500P that maps to a page. Input address 500P can be a GVA or GPA. Input address 500P includes an upper portion 506 that selects the page (a page number) and a lower portion that specifies an offset into the page (page offset 504). In this example, the page table hierarchy includes four levels. Upper portion 506 is divided into a level 0 table index $502_0$, a level 1 table index $502_1$, a level 2 table index $502_2$, and a level 3 table index $502_3$. Each table index 502 is used to select a descriptor in the respective table level. In other examples, an input address for the page can include a different number of table indexes, depending on the size of the page.

FIG. 5B is a block diagram illustrating the structure of an input address 500B that maps to a block. Input address 500B can be a GVA or a GPA. Input address 500B includes an upper portion 510 that selects the block and a lower portion that specifies an offset into the block (block offset 508). In the example, upper portion 510 is divided into a level 0 table index $502_0$ and a level 1 table index $502_1$. In other examples, an input address for a block can include only a level 0 table index or level 0, 1, and 2 table indexes, depending on the size of the block being addressed.

Returning to FIG. 1, the registers 114 include registers for specifying addresses of base page tables to be used in the translation schemes. For example, the ARM® v8 architecture specifies a TTBR0_EL1 that stores an address of a base page table for EL1/EL0 stage one address translations. If the VA space is divided into upper and lower regions, the register TTBR0_EL1 stores the base page table for the lower VA space and a register TTBR1_EL1 stores an address of a base page table for the upper VA space. The ARM® v8 architecture further specifies a register VTTBR_EL2 that stores an address of a base page table for EL1/EL0 stage two address translations. Each guest OS 134 maintains stage one page tables 122. Typically, a guest OS 134 maintains a set of stage one page tables 122 for each application 136. A guest OS 134 manipulates the appropriate register 114 (e.g., TTBR0_EL1) to switch between stage one page table hierarchies for context switches across applications 136. Hypervisor 130 maintains stage two page tables 123. Hypervisor 130 maintains a set of stage two page tables 123 for each VM 132. Hypervisor 130 manipulates the appropriate register 114 (e.g., VTTBR_EL2) to switch between stage two page table hierarchies for context switches across VMs 132. Stage two page tables 123 are also referred to as nested page tables (NPTs) or extended page tables (EPTs).

In an embodiment, hypervisor 130 optimizes stage two page tables 123 to reduce TLB pressure, use less memory, reduce faults, and the like. Hypervisor 130 executes a process per vCPU 146 that implements virtual address space scanner 138 and page table optimizer 139. Virtual address space scanner 138 scans the GVA space in use by a vCPU 146. Page table optimizer 139 optimizes a set of stage two page tables 123 based on results of the GVA space scan. In an embodiment, each VMM 144 executes instance(s) of virtual address space scanner 138 and page table optimizer 139.

One technique for scanning a GVA space is to walk stage one page tables 122 that define the mappings for the GVA space being scanned. However, a software-based scan of page tables is an involved process, particularly on a processor compliant with the ARM® v8 architecture. Notably, an ARM® v8-based processor includes two different page table roots for upper and lower VA ranges in stage one of the EL1/EL0 translation scheme. Further, an ARM® v8-based processor include different granularities of the page size (e.g., 4K, 16K, or 64K), which in turn also affects the block sizes, the number of levels in the page table hierarchy, and the number of entries in each table. Further, an ARM® v8-based processor has different initial lookup levels for page tables, wherein the input address range specified by the field TCR.TxSZ field controls how many total hierarchical levels of the page tables hierarchy. In an embodiment, virtual address space scanner 138 performs hardware-assisted scanning of a GVA space, which obviates the need for a complex software-based page walker. Virtual address space scanner 138 is more efficient than a software-based page walker, which reduces VM pauses and increases performance.

In an embodiment, the instruction set architecture (ISA) of each core 112 includes an address translation instruction. The address translation instruction includes operands for specifying the translation stage, the privilege level, the access type (read or write), and the IA. A core 112 executes the address translation instruction to translate the IA using MMU 116 given the requested translation stage, privilege level, and access type. The result of the address translation is stored in a specific register 114. For example, the A64 ISA defined in the ARM® v8 architecture includes an instruction AT <operation>, <Xt>, where <operation> controls the translation stage, privilege level, and access type, and <Xt> is the IA to be translated. The result of executing the AT instruction is stored in the register PAR ELL In one specific example, the instruction AT S1E1R, <Xt> is executable to perform a stage one translation of <Xt> (e.g., GVA to GPA) for EL1 read access. Executing the address translation instruction is similar to actually reading from or writing to the specified IA. However, if there is a fault, the address translation instruction does not throw an exception. Rather, the fault can be decoded from the result stored in the appropriate register (e.g., PAR_EL1).

Virtual address space scanner 138 uses the address translation instruction during scanning to translate GVAs to GPAs. Thus, virtual address space scanner 138 leverages architectural TLBs and avoids unnecessary TLB/cache pollution resulting from a software-based traversal of the page tables. Virtual address space scanner 138 performs a best-effort scan of the GVA space. Areas of the stage one page tables that were never accessed by the guest software would likely result in $2^{nd}$ stage failures, as those areas were never paged-in/backed by hypervisor 130, which also implies that those tables are empty and/or that the referenced physical memory has never been accessed. Since virtual address space scanner 138 is only interested in scanning the portion of a GVA space actually backed by memory, virtual address space scanner 138 skips over any such holes in the GPA space. Since the address translation instruction engages the same hardware page table walker used on instruction/data memory accesses, virtual address space scanner 138 detects any $2^{nd}$ stage faults due to missing $2^{nd}$ stage mappings for the accessed stage one page tables, but does not generate a nested exception, which lowers the cost of the GVA space scan.

Figure 6:
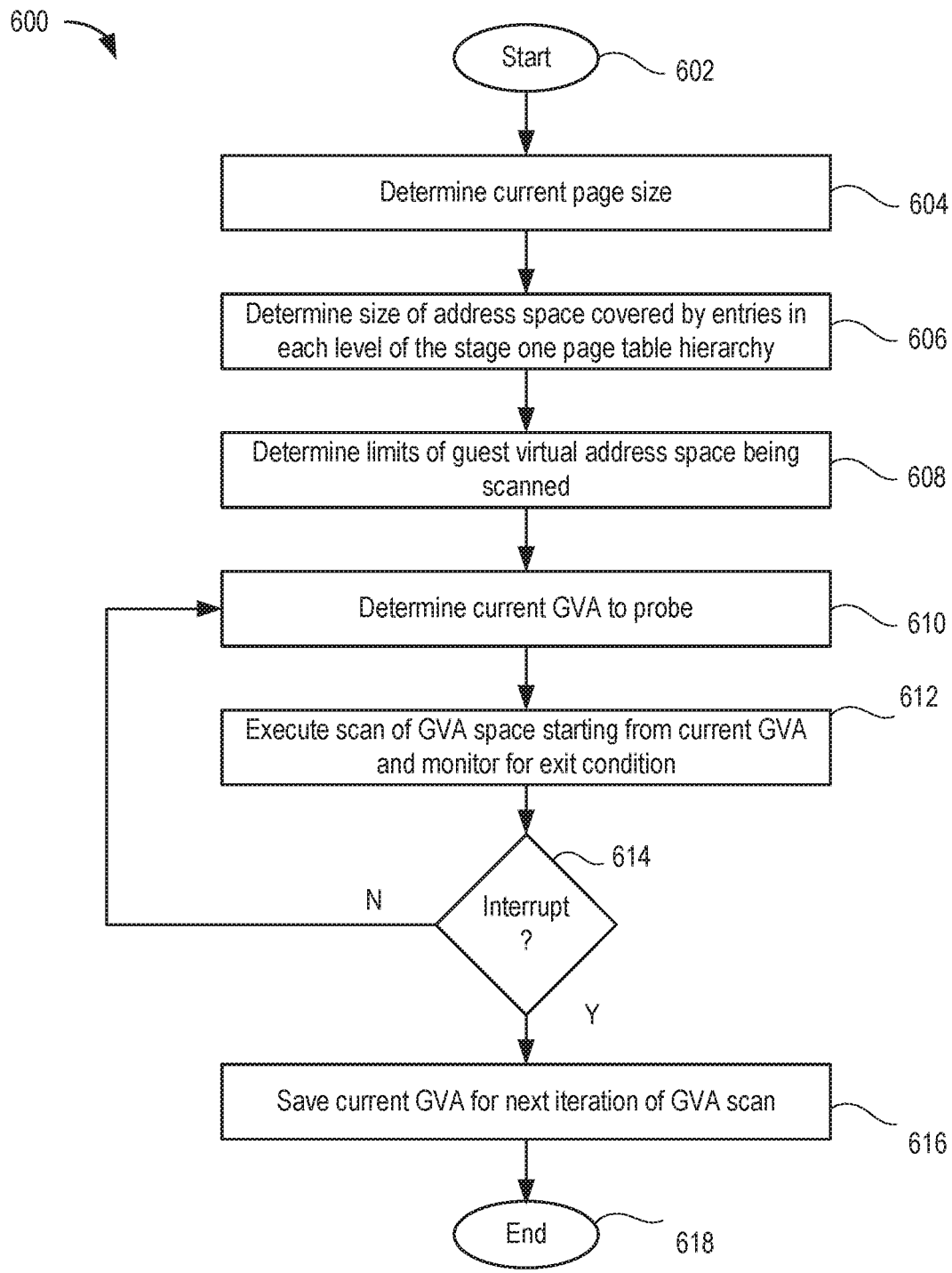
FIG. 6 is a flow diagram depicting a method of managing a virtual address space scan according to an embodiment.

FIG. 6 is a flow diagram depicting a method 600 of managing a GVA scan according to an embodiment. Method 600 may be performed by a component of hypervisor 130 such as, for example, VMM 144, through execution of an instance of virtual address space scanner 138. Hypervisor 130 executes method 600 during periodic or aperiodic scans of a GVA per vCPU 146. Method 600 assumes the guest has not attempted to disable the MMU of the vCPU or that hypervisor 130 has not enabled default cacheable mode (e.g., hypervisor 130 can enable default cacheable mode, rather than disabling the MMU, to handle the case where the guest has attempted to disable the MMU of vCPU). In such case, the GVA space is identity-mapped to the GPA space (i.e., GVA==GPA) and there is no need to scan the GVA space in order to optimize the second stage page tables.

Method 600 begins at step 602. At step 604, hypervisor 130 determines the current page size in use by vCPU 146 (which is physically a core 112 of CPU 108). For example, in the ARM® v8 architecture, hypervisor 130 reads the field TCR_EL1.TG1 to determine the current page size, which can be 4 KB, 16 KB, or 64 KB. At step 606, hypervisor 130 determines the size of the GVA space covered by table entries in each level of the stage one page table hierarchy. For example, given a 4 KB page size, the stage one page table hierarchy includes four levels: entries in level 0 cover 512 GB of GVA space; entries in level 1 cover 1 GB of GVA space; entries in level 2 cover 2 MB of GVA space; and entries in level 3 cover 4 KB of GVA space. In another example, given a 64 KB page size, the stage one page table hierarchy includes three levels: entries in level 1 cover 4 TB of GVA space; entries in level 2 cover 512 MB of GVA space; and entries in level 3 cover 64 KB of GVA space. In pseudocode, steps 604 and 606 can be implemented as:

```
switch (TCR_EL1.TG1) {
    case 4K:
        l3e_size = 4K
        l2e_size = 2MB
        l1e_size = 1G
        l0e_size = 512G
        break
    case 16K:
        l3e_size = 16K
        l2e_size = 32M
        l1e_size = 64G
        l0e_size = 128T
        break
    case 64K:
        l3e_size = 64K
        l2e_size = 512M
        l1e_size = 4T
        break
}
total_size = 256T
```

In the above pseudocode, l0e_size, l1e_size, l2e_size, and l3e_size represent the size of a memory region covered by descriptors in each level of the stage one page table hierarchy.

At step 608, hypervisor 130 determines the limits of the GVA space being scanned. Hypervisor 130 determines the start and end of the GVA (or the upper and lower portions of the GVA) based on the IA width defined by registers 114. For example, in the ARM® v8 architecture, the field TCR_EL1.T0SZ specifies the size of the lower portion of the GVA and TCR_EL1.T1SZ specifies the size of the upper portion of the GVA. In pseudocode, step 608 can be implemented as:

```
lower_va_start = 0
lower_va_end = 2^(64 - TCR_EL1.T0SZ) - 1
upper_va_start = 2^64 - 2^(64 - TCR_EL1.T1SZ)
upper_va_end = 0xFFFF_FFFF_FFFF_FFFF
```

At step 610, hypervisor 130 determines the current GVA to probe. If this is the first iteration of method 600, hypervisor 130 can select the start of the lower GVA space (e.g., 0x0). If this is a subsequent iteration of method 600, hypervisor 130 can select the last probed GVA before being interrupted.

At step 612, hypervisor 130 executes GVA space scan starting from the current GVA and monitors for an exit condition. A method of scanning a virtual address space that can be used in step 612 is described below with respect to FIG. 7. The exit condition can be an interrupt or an abort of the scan. For example, hypervisor 130 ensures that the scan of GVA space is interrupted after a certain number of vCPU cycles in order to reduce the impact on VM performance.

At step 614, upon an exit of the scan, hypervisor 130 determines if the scan exited due to an interrupt. If so, method 600 from step 614 to step 616, where hypervisor 130 saves the last GVA probed to be used as the initial GVA in the next iteration. If the scan exited for another reason (e.g., abort as discussed further below), method 600 returns to step 610 and selects another GVA as the current GVA. For example, in case of an abort of a scan of the lower VA region, method 600 can set the current GVA to begin scanning the upper VA region. In case of abort of a scan of the upper VA region, method 600 can set the current GVA to begin scanning the lower VA region. Method 600 ends at step 618.

Figure 7:
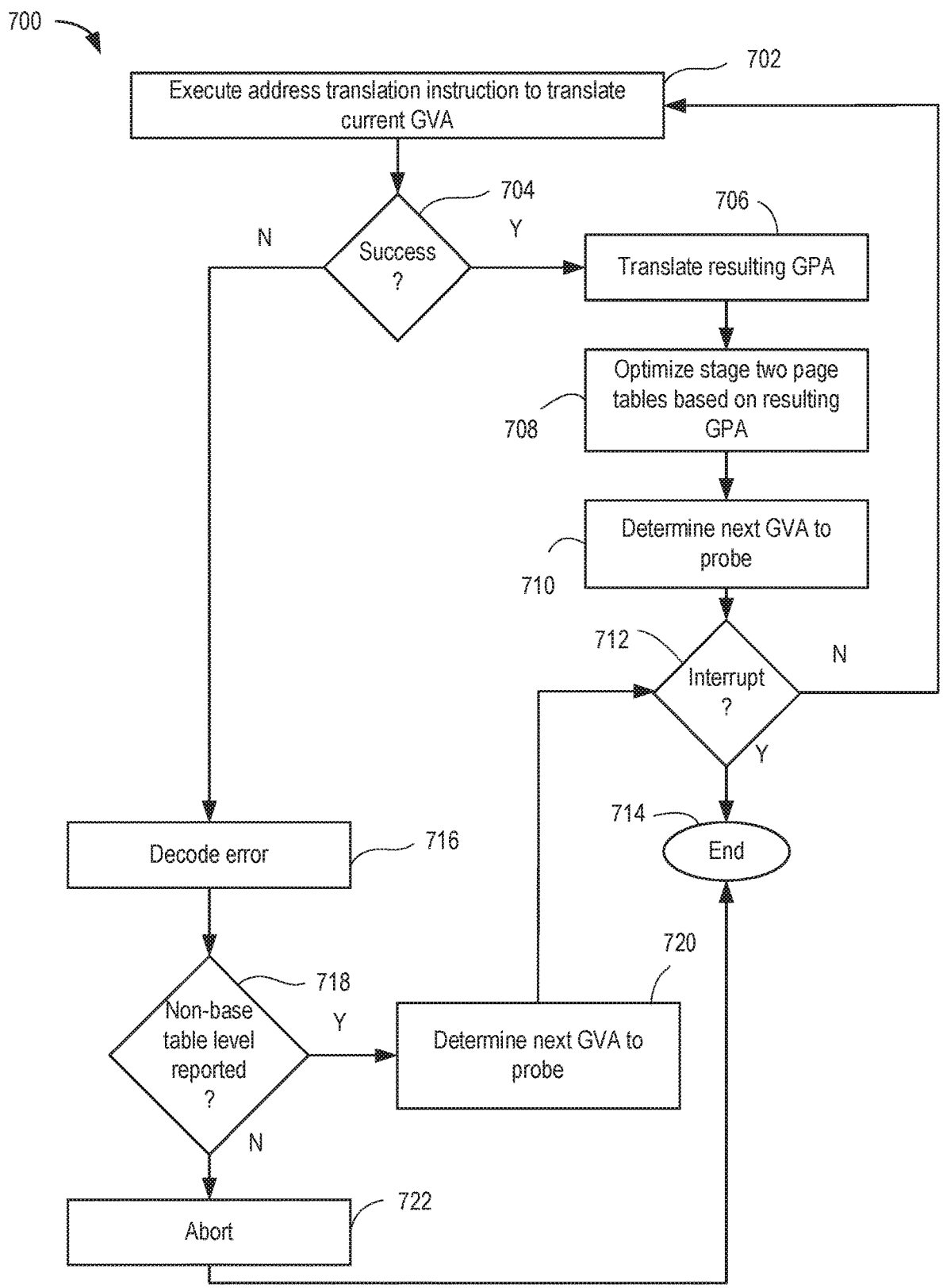
FIG. 7 is a flow diagram depicting a method of scanning a virtual address space according to an embodiment.

FIG. 7 is a flow diagram depicting a method 700 of scanning a virtual address space according to an embodiment. Method 700 may be performed by a component of hypervisor 130 such as, for example, VMM 144, which executes instances of virtual address space scanner 138 and page table optimizer 139. Hypervisor 130 executes method 700 in step 612 of method 600 described above to scan a GVA space.

Method 700 begins at step 702, where hypervisor 130 executes an address translation instruction to translate the current GVA. Hypervisor 130 configures the address translation instruction to perform a $1^{st}$ stage translation at EL1 for a read operation. For example, in the ARM® v8 architecture, hypervisor 130 can execute the instruction AT S1E1R, <current GVA>.

At step 704, hypervisor 130 determines if the address translation was successful. Hypervisor 130 can read the contents of the appropriate register 114 to obtain the results of the address translation instruction. For example, in the ARM® v8 architecture, hypervisor 130 can read from the register PAR_EL1.

If at step 704 the address translation of the current GVA was successful, method 700 proceeds to step 706. In general, in response to a successful address translation by the address translation instruction, hypervisor 130 can use the result to optimize the second stage page tables. For example, hypervisor 130 can track GPAs in use by the guest software and the corresponding GPA→HPA mappings. Hypervisor 130 can identify large blocks of GPAs in use by the guest and compact many table entries covering pages/blocks in the $2^{nd}$ stage page tables to less entries covering blocks/larger blocks. Hypervisor 130 can employ various well-known techniques for optimizing page tables given indications of GPAs in use by the guest software. Such techniques require scanning the GVA space, embodiments of which are described herein.

At step 706, hypervisor 130 translates the resulting GPA that was obtained by translating the current GVA at step 704. In an embodiment, hypervisor 130 effectively translations the GPA by using an address translation instruction that performs a two-stage address translation of the GVA (e.g., S12E0R or S12E1R for an ARM®-v8 processor). The two-stage address translation instruction returns a HPA mapped to the resulting GPA. In another embodiment, hypervisor 130 performs a software-based walk of the second stage page tables to translate the resulting GPA and obtain the HPA. The second stage page tables follow a single predefined format (e.g., cannot have arbitrary granule sizes) allowing for a simpler software-based page table walk operation. At step 708, hypervisor 130 optimizes the second stage page tables based on the GPA. For example, hypervisor 130 can track the GPAs in use by the guest software and the corresponding GPA→HPA mappings. Hypervisor 130 can use well-known optimization techniques for optimizing the GPA→HPA mappings in stage two page tables 123.

At step 710, hypervisor 130 determines a next GVA to probe. In general, hypervisor 130 enumerates through pages of GVA space by setting the current GVA to a base address of the next page. However, in some iterations, the scan can skip a number of pages in GVA space. For example, the optimization process performed at step 708 may indicate hole(s) in the GPA space in use by the guest software. Consider a case where the page size is set to 4 KB. In such case, a level 3 page table includes 512 entries. If a level 3 page table includes valid descriptors for all 512 entries, the optimization process may compact those 512 descriptors into a single block descriptor in a level 2 page table (e.g., a 2 MB block). However, if the scan reveals that a given level 3 page table is not full, the optimization process may be configured to skip compacting that level 3 page table. In such case, hypervisor 130 can set the current GVA to the base address of the next level 3 page table.

In another example, translation of the GPA may reveal that the stage two page tables already map the GPA to a block in the HPA space. For example, the second stage page tables may map the GPA to a 2 MB block in HPA space by a descriptor in a level 2 table. In such case, hypervisor 130 can set the current GVA to the base address of the next level 3 page table (i.e., the next 2 MB block).

At step 712, hypervisor 130 determines if the GVA scan should be interrupted. If so, method 700 proceeds to step 714 and ends. If the GVA scan should continue, method 700 returns to step 702.

If at step 704 the address translation was not successful, method 700 proceeds to step 716. At step 716, hypervisor 130 decodes the error in the result of the address translation. Errors can result during stage one translation (e.g., based on the stage one page tables) or from the stage two translation (e.g., hypervisor 130 has not backed some of the stage one page tables with physical memory in the HPA space). Stage two translation errors are reported as stage one translation faults. Note that even though the address translation instruction executed in step 702 was for a stage one translation, MMU 116 must still perform stage two translations of the output addresses from the stage one page tables (which are in GPA space). The appropriate register 114 (e.g., PAR_EL1) reports the level of the faulting page table and the type of fault.

At step 718, hypervisor 130 determines whether the error occurred at a non-base level table. If so, method 700 proceeds to step 720, where hypervisor 130 determines the next GVA to probe. Determination of the next GVA to probe depends on the level of the faulting page table reported in the error. If the error occurred at table level 1, the GVA scan skips by the size of a level 0 block. That is, hypervisor 130 sets the current GVA to a base address of the next level 1 page table. If the error occurred at table level 2, the GVA scan skips by the size of a level 1 block. That is, hypervisor 130 sets the current GVA to a base address of the next level 2 page table. If the error occurred at table level 3, the GVA scan skips by the size of a level 2 block. That is, hypervisor 130 sets the current GVA to a base address of the next level 3 page table. Method 700 proceeds from step 718 to step 712 and continues as described above.

If at step 718 the error occurred at the base table level or the error did not report a table level, method 700 proceeds to step 722 and aborts. There are two kinds of stage one translation errors: errors having a reported table level and errors that do not report a table level. Errors without a table level are usually "show stoppers" (i.e., machine check events) or guest OS errors. In such case, the GVA scan can be aborted. An error reporting the level of the base page table is also possible if the second stage page tables do not map the root of the first stage page tables (e.g., the address in TTBRx_EL1). There are no table levels above the base table level, so the GVA scan aborts.

Method 700 can be further understood with respect to the following example pseudocode:

```
for (gva = lower_va_start; gva < lower_va_end;) {
    AT_E1_R(gva)
    if (PAR_EL1.F == 0) {
        gva = handle_gva_gpa(gva, PAR_EL1.PA, l3e_size)
        continue }
    else {
        switch (PAR_EL1.FST) {
            case DFSC_ADDRESS_L1:
            case DFSC_XLATE_L1:
            case DFSC_ACCESS_L1:
            case DFSC_PERM_L1:
                gva = (gva & ~(l0e_size - 1)) + l0e_size
                continue
            case DFSC_ADDRESS_L2:
            case DFSC_XLATE_L2:
            case DFSC_ACCESS_L2:
            case DFSC_PERM_L2:
                gva = (gva & ~(l1e_size - 1)) + l1e_size
                continue
            case DFSC_ADDRESS_L3:
            case DFSC_XLATE_L3:
            case DFSC_ACCESS_L3:
            case DFSC_PERM_L3:
                gva = (gva & ~(l2e_size - 1)) + l2e_size
                continue
            case DFSC_XLATE_L0:
            default:
                goto abort
        }
    }
}
```

In the example pseudocode, the function AT_E1_R executes the instruction AT S1E1R, gva. The pseudocode then checks for an error in the address translation by checking the field PAR_EL1.F. If there is no error, the pseudocode executes the function handle_gva_gpa( ) which performs the optimization of the second stage page tables described above. The function handle_gva_gpa( ) also returns the next GVA to probe based on the logic described in step 710 above. If there was an error in the address translation, the pseudocode checks the reason for the error in the field PAR_EL1.FST. In this case, the pseudocode assumes four levels in the page table hierarchy. If the error occurred in any of levels 1, 2, or 3, the pseudocode computes the next GVA to probe based on the level of the faulting page table. Otherwise, for more serious errors, the pseudocode aborts.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of scanning a guest virtual address (GVA) space generated by a guest operating system executing in a virtual machine of a virtualized computing system, the method comprising:
    setting, in a scan of the GVA space by a hypervisor that manages the virtual machine, a current GVA to a first GVA in the GVA space;
    executing, by the hypervisor on a processor allocated to the virtual machine, an address translation instruction, which is included in an instruction set architecture (ISA) of each core of the processor having one or more cores, to perform a first address translation of the current GVA;
    reading a register of the processor to determine a first error resulting from the first address translation;
    determining, in response to the first error, a level of a faulting page table in a first page table hierarchy generated by the guest operating system; and
    setting the current GVA to a second GVA based on the level of the faulting page table.

2. The method of claim 1, further comprising:
    executing, on the processor, after setting the current GVA as the second GVA, the address translation instruction to perform a second address translation of the current GVA;
    reading the register to obtain a guest physical address (GPA) resulting from the second address translation; and
    setting the current GVA to a third GVA in the GVA space.

3. The method of claim 2, wherein the third GVA is the second GVA offset by a page size.

4. The method of claim 2, further comprising:
    determining that the GPA is mapped to a block in a host physical address (HPA) space of the virtualized computing system, the block defined in a level of the second page table hierarchy;
    wherein the third GVA is based on the level of the second page table hierarchy that defines the block.

5. The method of claim 2, further comprising:
    optimizing a second page table hierarchy generated by the hypervisor in response to the GPA.

6. The method of claim 1, further comprising:
    executing, on the processor, after setting the current GVA as the second GVA, the address translation instruction to perform a second address translation of the current GVA;
    reading the register to determine a second error resulting from the second address translation; and
    aborting the scan of the GVA space in response to the second error.

7. The method of claim 1, wherein the address translation instruction is configured to perform a first stage address translation in a two-stage address translation scheme of the processor.

8. A non-transitory computer readable medium having instructions stored thereon that when executed by a processor cause the processor to perform setting, in a scan of the GVA space by a hypervisor that manages the virtual machine, a current GVA to a first GVA in the GVA space;
    executing, by the hypervisor on a processor allocated to the virtual machine, an address translation instruction, which is included in an instruction set architecture (ISA) of each core of the processor having one or more cores, to perform a first address translation of the current GVA;
    reading a register of the processor to determine a first error resulting from the first address translation;
    determining, in response to the first error, a level of a faulting page table in a first page table hierarchy generated by the guest operating system; and
    setting the current GVA to a second GVA based on the level of the faulting page table.

9. The non-transitory computer readable medium of claim 8, further comprising:
    executing, on the processor, after setting the current GVA as the second GVA, the address translation instruction to perform a second address translation of the current GVA;
    reading the register to obtain a guest physical address (GPA) resulting from the second address translation; and
    setting the current GVA to a third GVA in the GVA space.

10. The non-transitory computer readable medium of claim 9, wherein the third GVA is the second GVA offset by a page size.

11. The non-transitory computer readable medium of claim 9, further comprising:
determining that the GPA is mapped to a block in a host physical address (HPA) space of the virtualized computing system, the block defined in a level of the second page table hierarchy;
wherein the third GVA is based on the level of the second page table hierarchy that defines the block.

12. The non-transitory computer readable medium of claim 9, further comprising:
optimizing a second page table hierarchy generated by the hypervisor in response to the GPA.

13. The non-transitory computer readable medium of claim 8, further comprising:
executing, on the processor, after setting the current GVA as the second GVA, the address translation instruction to perform a second address translation of the current GVA;
reading the register to determine a second error resulting from the second address translation; and
aborting the scan of the GVA space in response to the second error.

14. The non-transitory computer readable medium of claim 8, wherein the address translation instruction is configured to perform a first stage address translation in a two-stage address translation scheme of the processor.

15. A virtualized computing system, comprising:
a hardware platform including a processor and memory; and
a software platform executing on the hardware platform, the software platform including a hypervisor managing a virtual machine having a guest operating system executing therein, the guest operating system generating a guest virtual address (GVA) space, the hypervisor executable by the processor to:
set, in a scan of the GVA space, a current GVA to a first GVA in the GVA space;
execute, by the hypervisor on the processor, an address translation instruction, which is included in an instruction set architecture (ISA) of each core of the processor having one or more cores, to perform a first address translation of the current GVA;
read a register of the processor to determine a first error resulting from the first address translation;
determine, in response to the first error, a level of a faulting page table in a first page table hierarchy generated by the guest operating system; and
set the current GVA to a second GVA based on the level of the faulting page table.

16. The virtualized computing system of claim 15, wherein the hypervisor is further executable by the processor to:
execute, on the processor, after setting the current GVA as the second GVA, the address translation instruction to perform a second address translation of the current GVA;
read the register to obtain a guest physical address (GPA) resulting from the second address translation; and
set the current GVA to a third GVA in the GVA space.

17. The virtualized computing system of claim 16, wherein the third GVA is the second GVA offset by a page size.

18. The virtualized computing system of claim 16, wherein the hypervisor is further executable by the processor to:
determine that the GPA is mapped to a block in a host physical address (HPA) space of the virtualized computing system, the block defined in a level of the second page table hierarchy;
wherein the third GVA is based on the level of the second page table hierarchy that defines the block.

19. The virtualized computing system of claim 16, wherein the hypervisor is further executable by the processor to:
execute, on the processor, after setting the current GVA as the second GVA, the address translation instruction to perform a second address translation of the current GVA;
read the register to determine a second error resulting from the second address translation; and
abort the scan of the GVA space in response to the second error.

20. The virtualized computing system of claim 15, wherein the address translation instruction is configured to perform a first stage address translation in a two-stage address translation scheme of the processor.

* * * * *